No. 642,973. Patented Feb. 6, 1900.
D. GALBREATH.
TOOL FOR TRANSPLANTING BUDS.
(Application filed July 26, 1899.)
(No Model.)

WITNESSES:
Donn Twitchell

INVENTOR
D. Galbreath
BY Munn & Co.
ATTORNEYS

THE NORRIS PETERS CO., PHOTO-LITHO., WASHINGTON, D. C.

United States Patent Office.

DUNCAN GALBREATH, OF NEW ORLEANS, LOUISIANA.

TOOL FOR TRANSPLANTING BUDS.

SPECIFICATION forming part of Letters Patent No. 642,973, dated February 6, 1900.

Application filed July 26, 1899. Serial No. 725,178. (No model.)

*To all whom it may concern:*

Be it known that I, DUNCAN GALBREATH, of New Orleans, in the parish of Orleans and State of Louisiana, have invented a new and Improved Tool for Transplanting Buds, of which the following is a full, clear, and exact description.

The object of the invention is to provide a tool for removing a section of bark containing a bud or buds of a tree for the purpose of transplanting a bud and to so construct the device that the bark removed will be in circular form, and whereby the bud or buds upon the removed section of bark will not be injured in the least.

A further object of the invention is to provide a device of the character described especially adapted for budding such trees as pecan, chestnut, hickory, persimmon, and walnut and also to provide a circular budding device which can be quickly, effectually, and safely handled and which will be light, durable, and economic.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
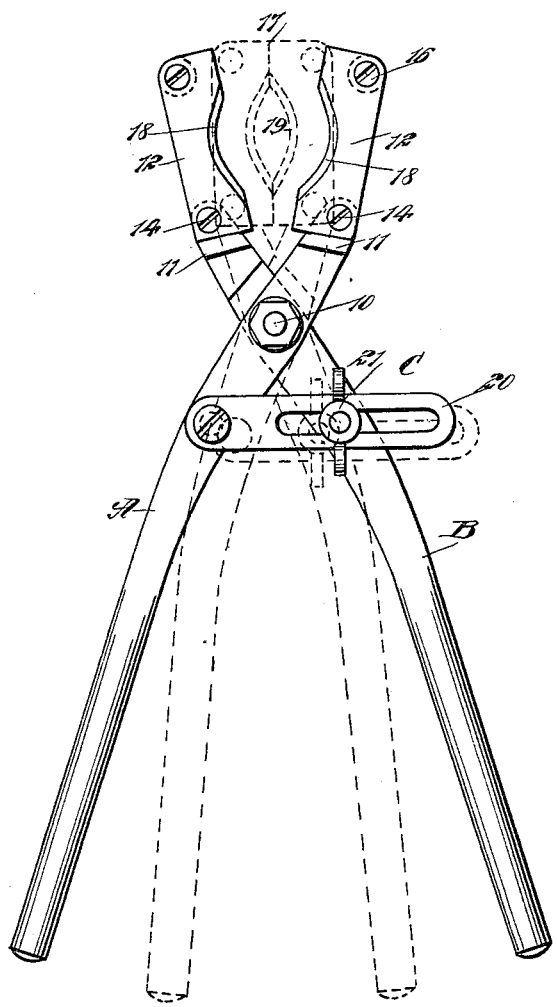
Figure 2:
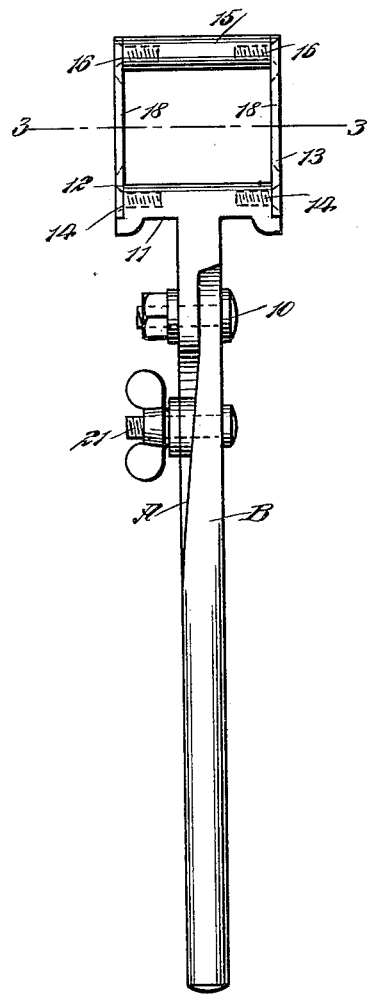
Figure 4:
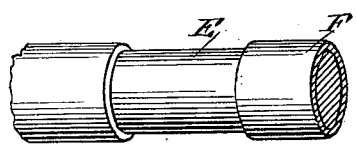
Figure 3:
Figure 5:
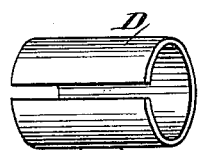

Figure 1 is a side elevation of the improved tool, illustrating it open in positive lines and closed in dotted lines. Fig. 2 is an edge view of the tool. Fig. 3 is a horizontal section on the line 3 3 of Fig. 2. Fig. 4 is a perspective view of a portion of a twig or branch upon which a bud is to be transplanted, the twig being prepared for the purpose; and Fig. 5 is a perspective view of the ring or sleeve of bark containing the bud that is to be transplanted.

The device consists of two handles A and B, pivotally connected near their upper ends, and at each upper end of each handle a crosshead 11 is preferably formed. Each handle is adapted to carry two blades 12 and 13. The blades are secured to the cross-bars 11 by means of screws 14 or their equivalents, and the upper portions of each pair of blades are connected by a spacing-bar 15, attached to the inner faces of the blades in any suitable or approved manner, screws 16 being shown for that purpose in the drawings. Each pair of blades carried by a handle constitutes virtually a jaw, and when the jaws are fully closed the blades come together at their top and bottom only, as shown at 17 in dotted lines in Fig. 1, since each blade at its inner edge, between its ends, is provided with a curved cutting edge 18, and each cutting edge 18 represents the half of an ellipse, so that when the jaws are closed together an elliptical opening 19 is provided between them, enabling the jaws to be adjusted to stems or twigs of different diameters.

It will be observed that the space between the blades is open, so that the bud may be kept visible and will not be injured; but, if desired, the space between the blades may be closed at the outer edges of said blade by a hood of any suitable construction.

The jaws are held in adjusted position by means of an adjusting device C, comprising a link 20, pivoted to one handle, which link receives a set-screw 21, carried by the other handle, as shown particularly in Fig. 1.

In operation the jaws are fitted to the exterior of the limb, twig, or branch from which the bud is to be removed, the bud being midway between the pairs of jaws. The jaws after having been closed firmly around the twig or branch are locked in such position, and the tool is turned around the twig or branch, thus cutting therefrom a sleeve or ring of bark D, (shown in Fig. 5,) carrying one or more buds $d$. The twig, branch, or stem F, to which the bud is to be transplanted, has a section of its bark removed by means of a similar tool, the space E thus formed on the wood between the ends of the bark corresponding to the length of the sleeve D, that is to be substituted for the removed plain section of bark. It may here be remarked that either prior to cutting the bark carrying the bud or after said bark has been cut by the device the sleeve so made is longitudinally cut, so as to readily remove it and so that said sleeve may be readily fixed in the space E prepared to receive it, after which it is treated in any well-known manner found effective in such work.

Having thus described my invention, I claim as new and desire to secure by Letters Patent—

1. A budding-tool, having two sets of opposed and movable knives supported from one end, the space between the sets being unobstructed, said knives being adapted to simultaneously engage the twig or limb above and below the bud to cut the bark peripherally, substantially as described.

2. A budding-tool, having two sets of opposed and movable knives supported from one end, with the space between the sets unobstructed, the outer ends of corresponding knives in each set being connected by a cross bar or pin, said knives having their cutting edges inward and being adapted to simultaneously engage the twig or limb above and below the bud to cut the bark peripherally, substantially as described.

3. A budding-tool, having two sets of opposed and movable knives supported from one end, with the space between the sets unobstructed, the outer ends of corresponding knives in each set being connected by a cross bar or pin, said knives having their cutting edges inward and being adapted to simultaneously engage the twig or limb above and below the bud to cut the bark peripherally, and means for locking the knives in adjusted position, substantially as described.

4. A budding-tool, comprising two pivoted levers each having upon one end a cross-head, and knife-blades secured by one end to each end of said cross-head and projecting in the general direction of the levers, the space between the knives attached to each cross-head being open, said blades having their cutting edges facing inward, substantially as described.

5. A budding-tool, comprising two pivoted levers each having a cross-head upon one end, the ends of the cross-heads having recessed or shouldered knife-seats therein, a knife-blade secured by one end to each end of each cross-head in the seats thereof with the space between the knives attached to each cross-head unobstructed, said blades having their cutting edges facing inward, and cross bars or bolts connecting the outer ends of the two blades upon each cross-head, substantially as described.

DUNCAN GALBREATH. [L. S.]

Witnesses:
JNO. J. WARD,
CHAS. M. HERO.